(12) United States Patent
Taniguchi

(10) Patent No.: US 12,417,879 B2
(45) Date of Patent: Sep. 16, 2025

(54) MULTILAYER CERAMIC ELECTRONIC DEVICE AND MANUFACTURING METHOD OF THE SAME

(71) Applicant: TAIYO YUDEN CO., LTD., Tokyo (JP)

(72) Inventor: Katsuya Taniguchi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 198 days.

(21) Appl. No.: 18/303,499

(22) Filed: Apr. 19, 2023

(65) Prior Publication Data

US 2023/0352240 A1    Nov. 2, 2023

(30) Foreign Application Priority Data

Apr. 28, 2022    (JP) .................................. 2022-074358

(51) Int. Cl.
*H01G 4/12*    (2006.01)
*H01G 4/012*   (2006.01)
*H01G 4/30*    (2006.01)

(52) U.S. Cl.
CPC ............ *H01G 4/1272* (2013.01); *H01G 4/012* (2013.01); *H01G 4/30* (2013.01)

(58) Field of Classification Search
CPC .......... H01G 4/1272; H01G 4/012; H01G 4/30
USPC ...... 361/301.4, 321.1, 321.4, 321.5, 311, 312
See application file for complete search history.

(56) References Cited

U.S. PATENT DOCUMENTS

| | | | |
|---|---|---|---|
| 2013/0208399 A1* | 8/2013 | Morita | H01G 4/30 361/301.4 |
| 2017/0092424 A1* | 3/2017 | Morito | H01G 4/224 |
| 2017/0301471 A1* | 10/2017 | Ono | H01G 4/224 |
| 2018/0240598 A1* | 8/2018 | Tanaka | H01G 4/232 |
| 2019/0252120 A1* | 8/2019 | Sakate | B32B 37/10 |
| 2019/0355517 A1* | 11/2019 | Chigira | H01G 4/1227 |
| 2021/0098194 A1 | 4/2021 | Teraoka et al. | |

FOREIGN PATENT DOCUMENTS

| | | |
|---|---|---|
| JP | 2020-031242 A | 2/2020 |
| JP | 2021-052132 A | 4/2021 |

* cited by examiner

*Primary Examiner* — Arun Ramaswamy
(74) *Attorney, Agent, or Firm* — Stein IP, LLC

(57) ABSTRACT

A multilayer ceramic electronic device includes a multilayer chip. The multilayer chip has a capacity section and a side margin. The side margin includes boron and silicon, and includes a first section and a second section in order from the capacity section side toward outside. A boron concentration of the first section is larger than a boron concentration of the second section. A segregation degree of silicon in the second section is larger than a segregation degree of silicon in the first section.

14 Claims, 9 Drawing Sheets

MULTILAYER CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2022-074358, filed on Apr. 28, 2022, the entire contents of which are incorporated herein by reference.

FIELD

A certain aspect of the present invention relates to a multilayer ceramic electronic device and a manufacturing method of the multilayer ceramic electronic device.

BACKGROUND

Progress is being made in miniaturizing and increasing the capacity of multilayer ceramic capacitors. Therefore, dielectric layers and internal electrode layers are becoming thinner.

SUMMARY OF THE INVENTION

According to an aspect of the present invention, there is provided a multilayer ceramic electronic device including: a multilayer chip having a multilayer portion in which each of a plurality of dielectric layers and each of a plurality of internal electrode layers are alternately stacked and each of the plurality of internal electrode layers is alternately exposed to a first end face and a second end face opposite to the first end face of the multilayer chip, the multilayer chip having an upper face and a lower face in a stacking direction and two side faces other than the first end face and the second end face, wherein the multilayer chip has a capacity section, in which a set of internal electrode layers exposed to the first end face of the multilayer chip face another set of internal electrode layers exposed to the second end face of the multilayer chip, and a side margin covering end portions of the plurality of internal electrode layers and the plurality of dielectric layers on the side of the two side faces, a main component of the side margin being ceramic, wherein the side margin includes boron and silicon, and includes a first section and a second section in order from the capacity section side toward outside, wherein a boron concentration of the first section is larger than a boron concentration of the second section, and wherein a segregation degree of silicon in the second section is larger than a segregation degree of silicon in the first section.

According to another aspect of the present invention, there is provided a manufacturing method of a multilayer ceramic electronic device including: preparing each of stack units in which an internal electrode pattern, a first dielectric pattern including boron and silicon and positioned outside of the internal electrode pattern, and a second dielectric pattern including boron and silicon and positioned outside of the first dielectric pattern and having a lower boron concentration than that in the first dielectric pattern are formed on a dielectric green sheet; obtaining an unfired multilayer chip by stacking a plurality of the stack units; and firing the unfired multilayer chip.

DETAILED DESCRIPTION

As the dielectric layers and internal electrode layers are made thinner, the diameter of the dielectric material and internal electrode material is also significantly reduced. Therefore, it becomes difficult to ensure stability during sintering. However, for reliability design, the sintering design of the side margin is also important from the viewpoint of preventing moisture intrusion in addition to the capacity section.

When the metal component of the internal electrode layer is oxidized during reduction firing, diffusion occurs in the surrounding dielectric (capacity section and side margin). However, the diffusion concentration of the metal component is larger in the capacity section than in the side margin. Diffusion of the metal component contributes to the promotion of densification in the firing process, so densification of the side margin tends to be delayed compared to the capacity section. Therefore, it is conceivable to advance the sintering of the side margin to the densification level necessary to ensure moisture resistance. However, in this case, there is a problem that the capacity section is oversintered, the life is shortened due to the spheroidization of the internal electrode layers, and sufficient reliability cannot be obtained.

A description will be given of an embodiment with reference to the accompanying drawings.

First Embodiment

Figure 1:
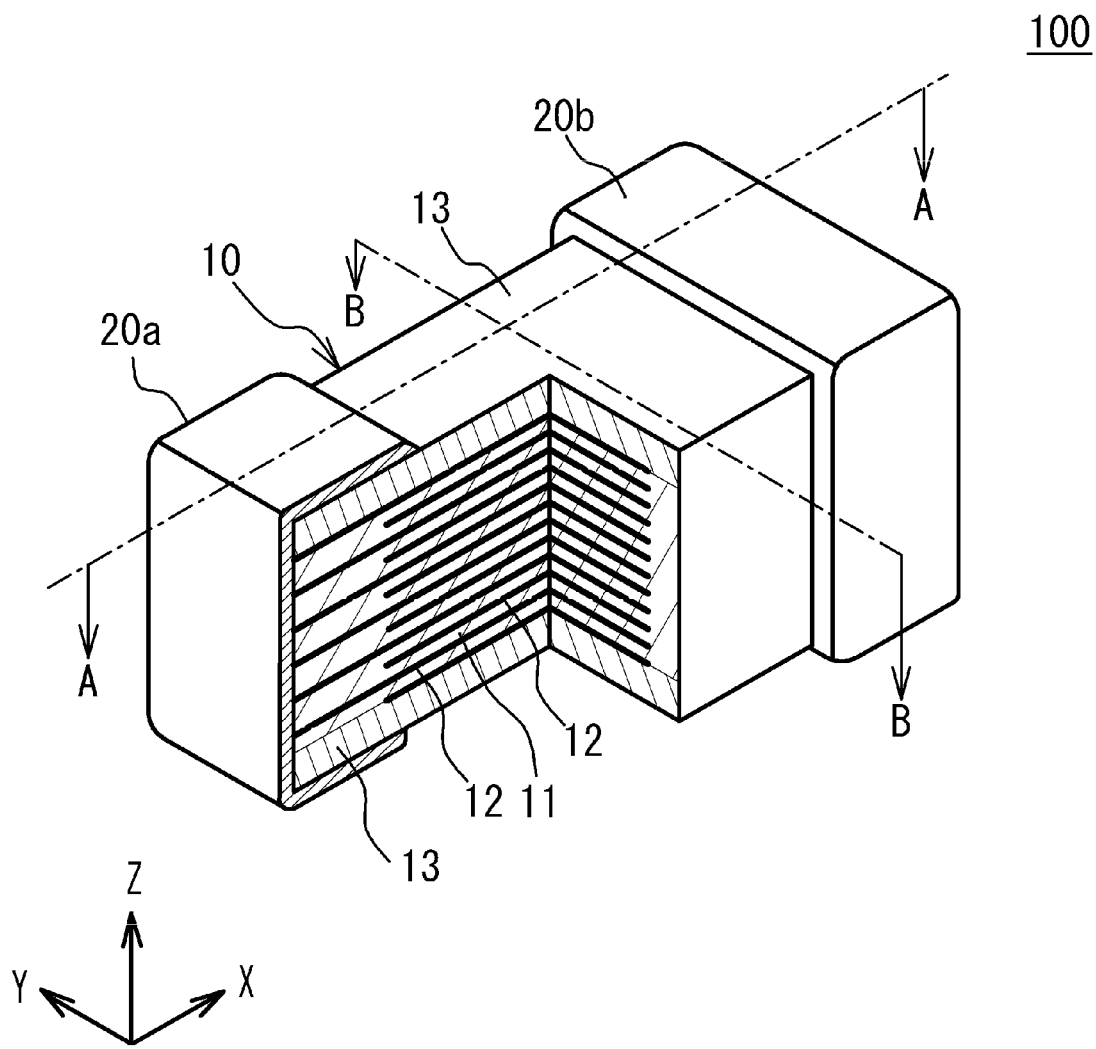
FIG. 1 illustrates a perspective view of a multilayer ceramic capacitor in which a cross section of a part of the multilayer ceramic capacitor is illustrated.
Figure 2:
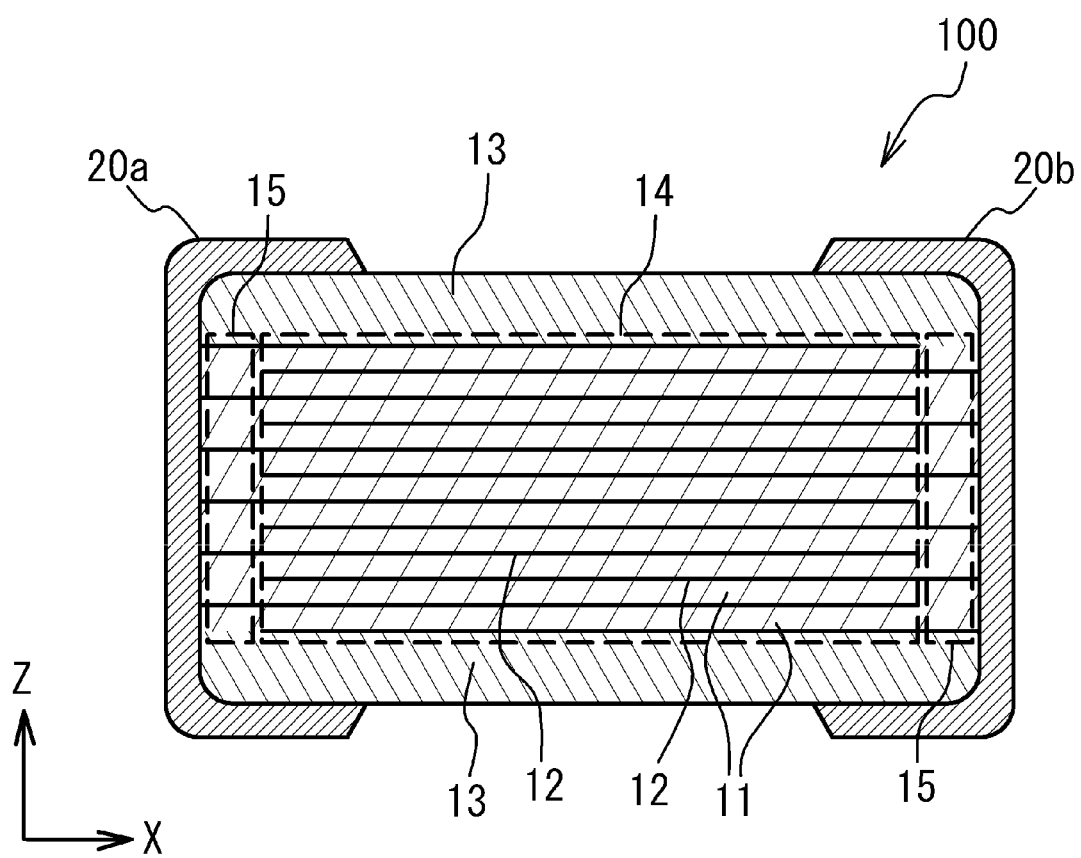
FIG. 2 illustrates a cross sectional view taken along a line A-A of FIG. 1.
Figure 3:
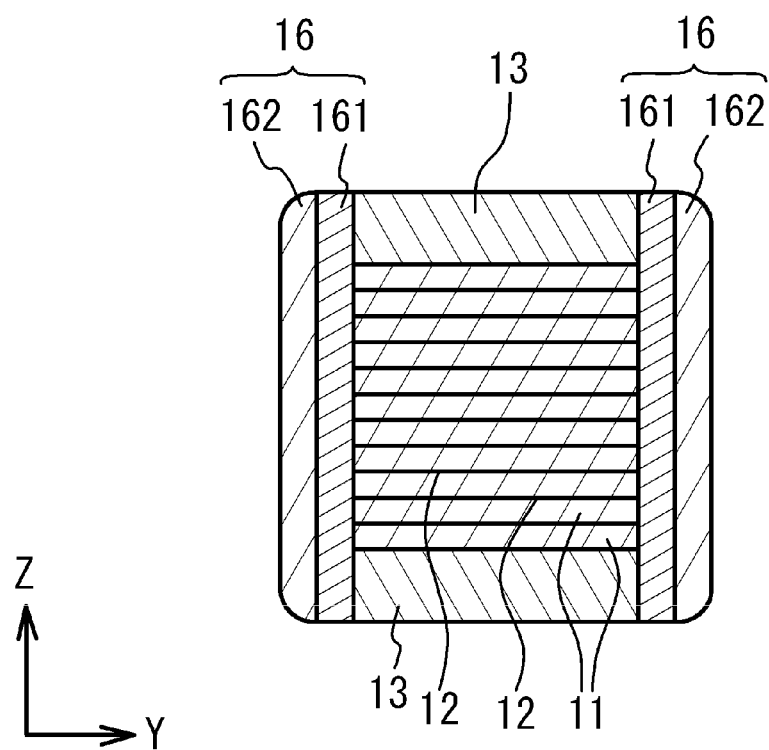
FIG. 3 illustrates a cross sectional view taken along a line B-B of FIG. 1.

FIG. 1 illustrates a perspective view of a multilayer ceramic capacitor 100 in accordance with a first embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

In FIG. 1 to FIG. 3, an X-axis direction is a longitudinal direction of the multilayer chip 10. The X-axis direction is a direction in which the two end faces of the multilayer chip 10 are opposite to each other and in which the external electrode 20a is opposite to the external electrode 20b. A Y-axis direction is a width direction of the internal electrode layers. The Y-axis direction is a direction in which the two side faces of the multilayer chip 10 are opposite to each other. A Z-axis direction is a stacking direction. The Z-axis direction is a direction in which the upper face of the multilayer chip 10 is opposite to the lower face of the multilayer chip 10. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 includes ceramic material acting as a dielectric material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 may be the same as that of the dielectric layer 11 or may be different from that of the dielectric layer 11. If the internal electrode layers are alternately exposed to different two faces and conducted to two different external electrodes, the structure of the multilayer ceramic capacitor 100 is not limited to FIG. 1 to FIG. 3.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The internal electrode layers 12 are mainly composed of a base metal such as nickel (Ni), copper (Cu), tin (Sn) or the like. As the internal electrode layers 12, a noble metal such as platinum (Pt), palladium (Pd), silver (Ag), gold (Au), and alloys containing these noble metals may be used. The thickness of the internal electrode layer 12 is, for example, 0.1 μm or more and 1 μm or less.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like. For example, the dielectric layer 11 contains 90 at % or more of the main component ceramic. The thickness of the dielectric layer 11 is, for example, 2 μm or more and 5 μm or less, 1 μm or more and 3 μm or less, and 0.2 μm or more and 1.0 μm or less.

Additives may be added to the dielectric layer 11. As additives to the dielectric layer 11, zirconium (Zr), hafnium (Hf), magnesium (Mg), manganese (Mn), molybdenum (Mo), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of Co (cobalt), Ni (nickel), Li (lithium), B (boron), Na (sodium), K (potassium) or Si (silicon), or a glass including cobalt, nickel, lithium, boron, sodium, potassium or silicon.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

The side margin 16 is mainly composed of a ceramic material. The main component ceramic of the side margin 16 may have the same composition as the main component ceramic of the dielectric layer 11 in the capacity section 14, or may have a different composition from the main component ceramic of the dielectric layer 11 in the capacity section 14. The main component ceramic of the side margin 16 and the main component ceramic of the dielectric layer 11 in the capacity section 14 may differ only in the kind and content of the additive. The side margin 16 contains boron and silicon as additives, and has a first section 161 and a second section 162 in order from the capacity section 14 side toward the outside.

The boron concentration in the first section 161 is higher than the boron concentration in the second section 162. Since boron has a function of promoting sintering of the ceramic material, the first section 161 can be densified within a range that does not cause oversintering of the capacity section 14. As a result, entry of moisture into the capacity section 14 can be suppressed. The concentration of boron means the ratio of an amount of boron when an amount of the B-site element of the main component ceramic having a perovskite structure is 100 at %. In addition, since oversintering in the capacity section 14 can be suppressed, spheroidization of the internal electrode layers 12 can be suppressed, shortening of life can be suppressed, and excellent reliability can be realized.

Figure 4:
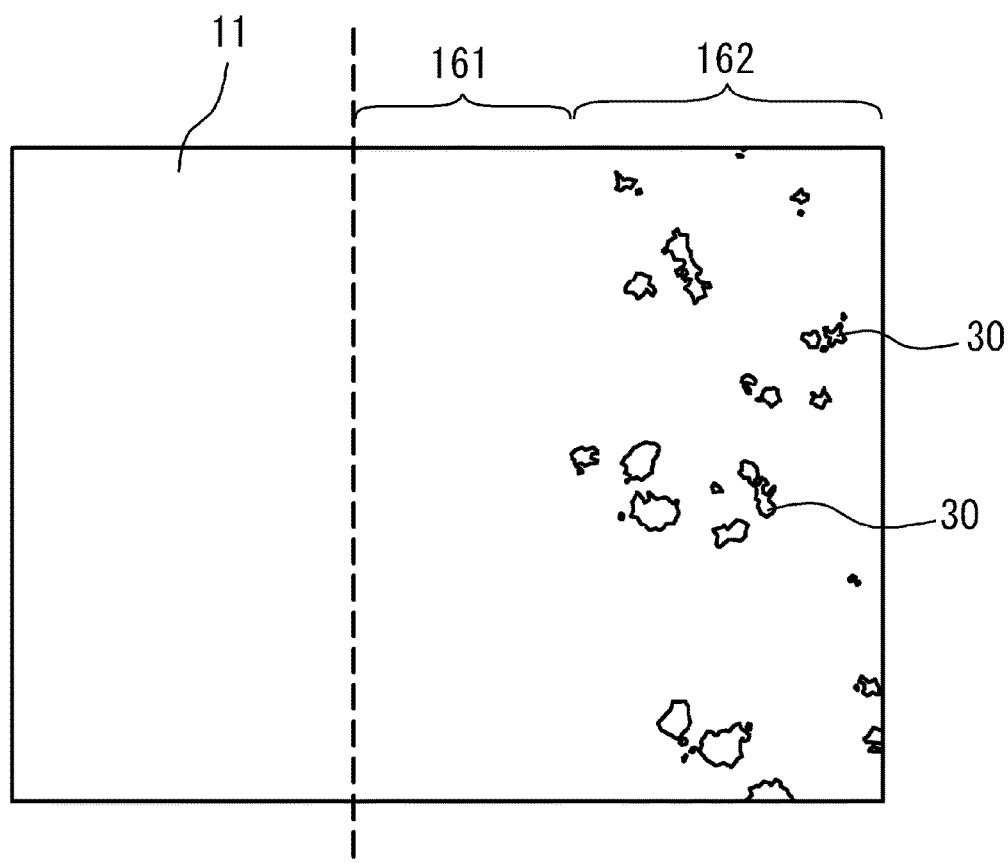
FIG. 4 illustrates segregation of silicon.

On the other hand, the boron concentration in the second section 162 is lower than the boron concentration in the first section 161. Therefore, although the second section 162 is not as dense as the first section 161, the degree of silicon segregation gets larger. Therefore, the degree of segregation of silicon in the second section 162 is greater than the degree of segregation of silicon in the first section 161. For example, as exemplified in FIG. 4, in the second section 162, silicon agglomerates and segregates to form inclusions 30, increasing the degree of segregation. In the first section 161, silicon is not segregated, or the degree of segregation is small even if the inclusions 30 are segregated. By locating the second section 162 where the degree of segregation of silicon is high outside the side margins 16, even if the side margin 16 has a low degree of densification, the intrusion of moisture from the outside of the side margin 16 can be suppressed.

As described above, in the present embodiment, the side margin 16 includes the first section 161 and the second section 162, so that a multilayer ceramic capacitor with excellent moisture resistance and reliability can be realized.

The degree of segregation of the inclusions 30 of silicon can be measured, for example, using an EPMA (Electron Probe Micro Analyzer). The degree of segregation of the inclusions 30 of silicon can be defined, for example, as a region where the strength of silicon is at least twice that of the surrounding area and has a size of 1 square μm or more. The measurement range may be, for example, approximately 30 μm×40 μm.

In the side margin 16, boron is present in the form of oxides or glasses, for example. In the side margin 16, the inclusions 30 of silicon are present in the form of oxides or glasses, for example.

Figure 5A:
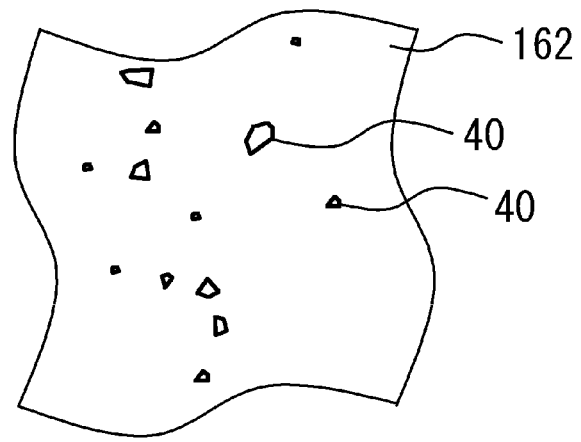
FIG. 5A illustrates pores.
Figure 5B:
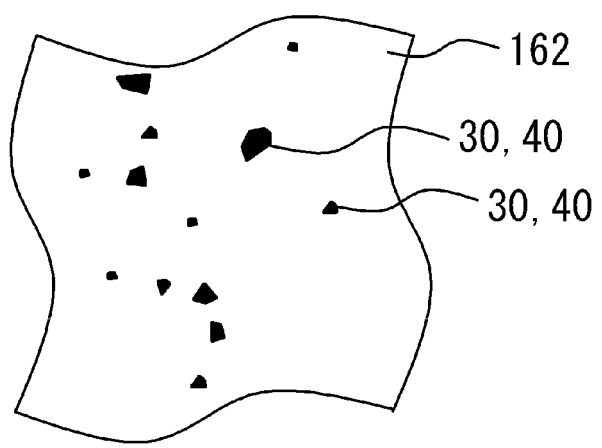
FIG. 5B illustrates segregation of silicon in pores.

For example, when the boron concentration in the second section 162 is low and densification is not sufficient, pores 40 may be formed in the second section 162 as illustrated in FIG. 5A. When the pores 40 are formed, the inclusions 30 of silicon are preferably arranged within the pores 40 as illustrated in FIG. 5B. In this case, intrusion of moisture through the pores 40 can be suppressed. Note that the inclusions 30 are shown in black in FIG. 5B.

In the side margin 16, it is preferable that the concentration of boron gradually decreases (decreases) from the capacity section 14 side toward the outside along the Y-axis direction. In this configuration, the denseness can be increased on the side of the first section 161 near the capacity section 14. As a result, it is possible to effectively suppress entry of moisture into the capacity section 14. In addition, the degree of segregation of the inclusions 30 of silicon can be increased in the vicinity of the outer surface of the second section 162. Thereby, on the surface of the side margin 16, it is possible to effectively suppress the intrusion of moisture from the outside. Here, "gradual decrease" includes continuous decrease (monotonic decrease), and the total decrease while repeating up and down when measuring the concentration of boron at a plurality of sample points outward from the capacity section 14 side along the Y-axis direction.

Figure 6:
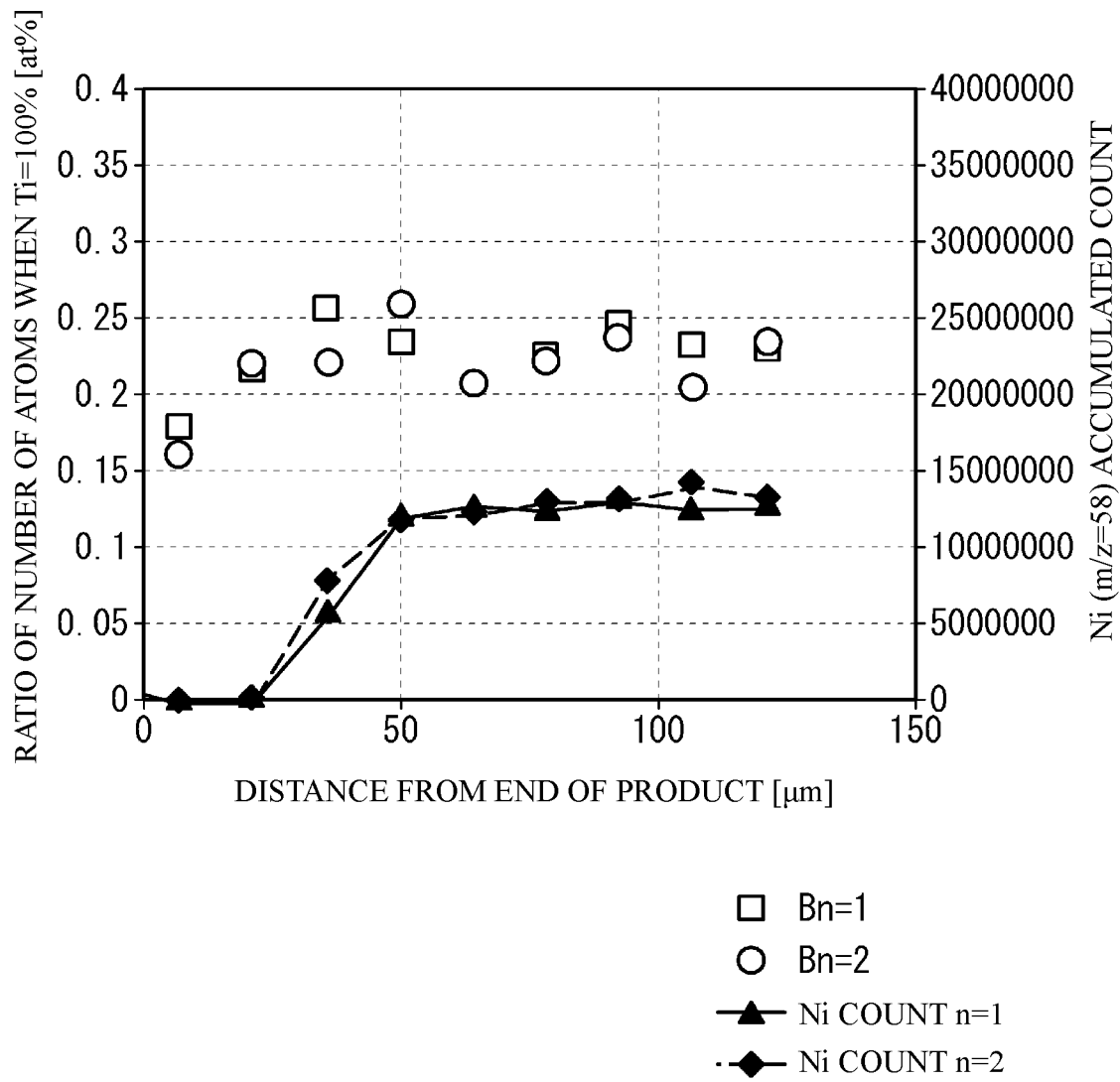
FIG. 6 illustrates measurement result of LA-ICP-MS.

For example, FIG. 6 is a diagram illustrating LA (Laser Ablation)-ICP (Inductively Coupled Plasma)-MS (Mass Spectrometry) measurement results. In the measurement of FIG. 6, Ni is used as the main component metal of the internal electrode layers 12. Barium titanate is used as the main component ceramic of the dielectric layer 11.

In FIG. 6, the horizontal axis indicates the distance (μm) from the surface of the side margin 16 in the Y-axis direction. Therefore, 0 μm means the surface of the side margin 16. The left vertical axis indicates the atomic ratio (at %) of boron to 100 at % of titanium. The vertical axis on the right shows nickel (m/z=58) integrated counts.

"Bn=1" indicates the result of the first measurement of boron. "Bn=2" indicates the result of the second measurement of boron. "Ni count n=1" indicates the result of the first Ni measurement. "Ni count n=2" indicates the result of the second Ni measurement. As illustrated in FIG. 6, the accumulated nickel count is substantially constant at distances greater than 50 μm. This is because the internal electrode layers 12 are present at distances greater than 50 μm. The integrated count of nickel gradually decreases from around 50 μm to around 25 μm. This is because the interface between the capacity section 14 and the side margin 16 exists from about 50 μm to about 25 μm. For example, the interface between the capacity section 14 and the side margin 16 can be defined as a position that is half the substantially constant value of 50 μm or more.

At distances greater than 50 μm, the atomic ratio of boron is approximately constant. This is because the dielectric layer 11 in the capacity section 14 is doped with boron. As illustrated in FIG. 6, it is preferable that the boron concentration gradually decreases from the interface defined above to 0 μm. Note that the boron concentration in the second section 162 is lower than the boron concentration in the dielectric layer 11 of the capacity section 14, as illustrated in FIG. 6, for example.

If the thickness of the second section 162 is thin, the effect of suppressing moisture intrusion is reduced. The ratio of the Y-direction thickness of the first section 161 to the Y-direction thickness of the second section 162 is 1:1, 2:3, or 1:2.

From the viewpoint of increasing the difference in the segregation degree of silicon, it is preferable to set a lower limit on the difference between the average boron concentration in the first section 161 and the average boron concentration in the second section 162. For example, the difference between the average boron concentration in the first section 161 and the average boron concentration in the second section 162 is preferably 0.1 at % or more, more preferably 0.15 at % or more, and still more preferably 0.3 at % or more.

On the other hand, from the viewpoint of suppressing cracks that occur when the difference in degree of densification increases, it is preferable to set an upper limit on the difference between the average boron concentration in the first section 161 and the average boron concentration in the second section 162. For example, the difference between the average boron concentration in the first section 161 and the average boron concentration in the second section 162 is preferably 1.0 at % or less, more preferably 0.8 at % or less, and still more preferably 0.6 at % or less.

From the viewpoint of suppressing oversintering of the capacity section 14, it is preferable to set a lower limit to the average concentration of boron in the first section 161. For example, the average boron concentration in the first section 161 is preferably 0.1 at % or higher, more preferably 0.2 at % or higher, and even more preferably 0.3 at % or higher.

From the viewpoint of suppressing oversintering of the side margin 16, it is preferable to set an upper limit on the average concentration of boron in the first section 161. For example, the average boron concentration in the first section 161 is preferably 1.5 at % or less, more preferably 1.2 at % or less, and even more preferably 1.0 at % or less.

From the viewpoint of densification of the side margin 16, it is preferable to set a lower limit to the average concentration of boron in the second section 162. For example, the average boron concentration in the second section 162 is preferably 0.05 at % or higher, more preferably 0.1 at % or higher, and even more preferably 0.2 at % or higher.

From the viewpoint of securing the segregation degree of silicon, it is preferable to set an upper limit on the average concentration of boron in the second section 162. For example, the average boron concentration in the second section 162 is preferably 1.0 at % or less, more preferably 0.8 at % or less, and even more preferably 0.6 at % or less.

From the viewpoint of suppressing oversintering of the capacity section 14, it is preferable to set a lower limit to the average concentration of silicon in the first section 161 and the second section 162. For example, the average concentration of silicon in the first section 161 and the second section 162 is preferably 0.1 at % or more, more preferably 0.2 at % or more, and still more preferably 0.3 at % or more.

From the viewpoint of suppressing oversintering of the side margin 16, it is preferable to set an upper limit to the concentration of silicon in the first section 161 and the second section 162. For example, the concentration of silicon in the first section 161 and the second section 162 is preferably 1.2 at % or less, more preferably 1.0 at % or less, and still more preferably 0.8 at % or less.

Figure 7:
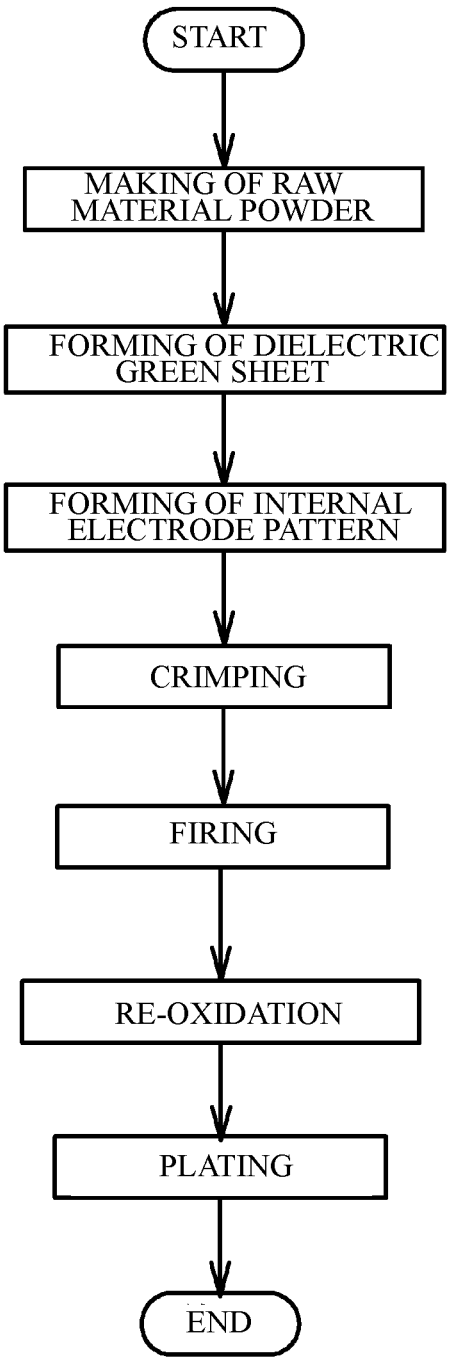
FIG. 7 illustrates a manufacturing method of a multilayer ceramic capacitor.

Next, a description will be given of a manufacturing method of the multilayer ceramic capacitors 100. FIG. 7 illustrates a manufacturing method of the multilayer ceramic capacitor 100.

(Making Process of Raw Material Powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of zirconium, hafnium, magnesium, manganese, vanadium, chromium, rare earth elements (yttrium, samarium, europium, gadolinium, terbium, dysprosium, holmium, erbium, thulium and ytterbium) or an oxide of cobalt, nickel, lithium, boron, sodium, potassium or silicon, or a glass including cobalt, nickel, lithium, boron, sodium, potassium or silicon. Among the additive compounds, $SiO_2$ acts as a sintering assistant.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the particle diameter of the resulting ceramic power may be adjusted by combining the crushing and classifying. With the processes, a dielectric material is obtained. Zirconia beads or the like can be used for pulverization. By using zirconia beads, a small amount of zirconium can be added to the dielectric material.

Next, a first dielectric pattern material for forming the first section 161 is prepared. The first dielectric pattern material includes powder of the main component ceramic of the first section 161. As the main component ceramic powder, for example, the main component ceramic powder of the dielectric material can be used. A predetermined additive compound is added according to the purpose. At least boron and silicon are added in the form of oxides or the like.

Next, a second dielectric pattern material for forming the second section 162 is prepared. The second dielectric pattern material includes the main component ceramic powder of the second section 162. As the main component ceramic powder, for example, the main component ceramic powder of the dielectric material can be used. A predetermined additive compound is added according to the purpose. At least boron and silicon are added in the form of oxides or the like.

The boron concentration in the main component ceramic in the first section 161 is made higher than the boron concentration in the main component ceramic in the second section 162. On the other hand, the silicon concentration in the main component ceramic in the second section 162 may be the same as or different from the silicon concentration in the main component ceramic in the first section 161.

(Forming Process of Dielectric Green Sheet) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 51 is formed on a base material by, for example, a die coater method or a doctor blade method, and then dried. The base material is, for example, PET (polyethylene terephthalate) film.

Figure 8A:
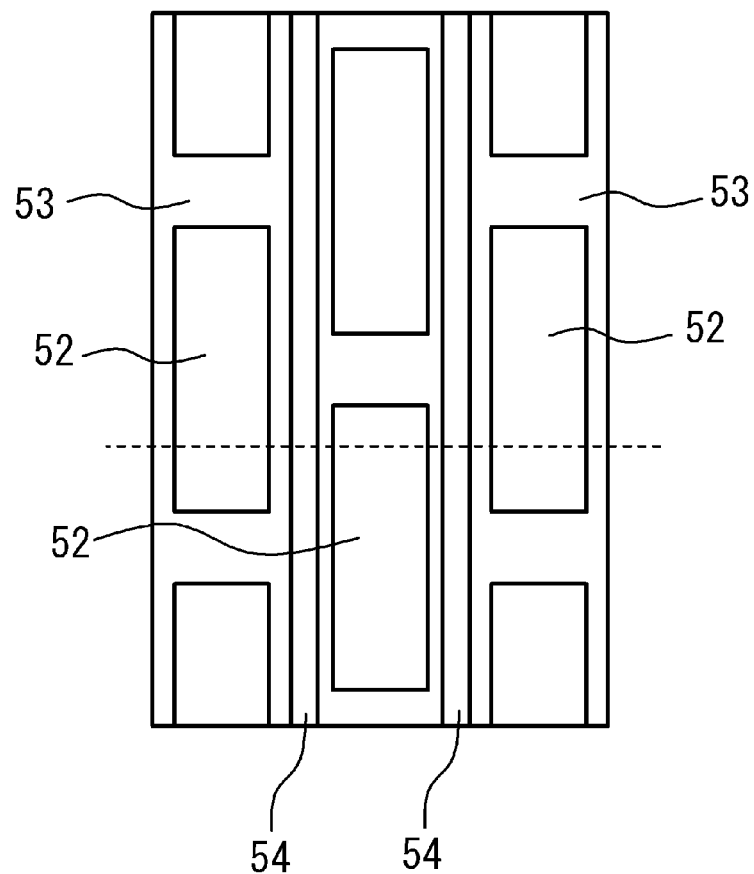
FIG. 8A and FIG. 8B illustrate a stacking process.
Figure 8B:
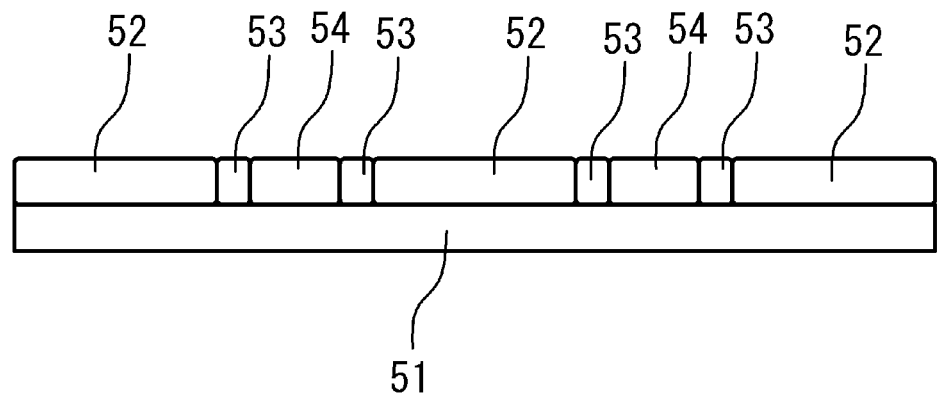

(Forming Process of Internal Electrode Pattern) Next, as illustrated in FIG. 8A and FIG. 8B, an internal electrode pattern 52 is formed on the dielectric green sheet 51. FIG. 8A is a plan view. FIG. 8B is a cross sectional view. In FIG. 8B, hatching is omitted. A metal paste of the main component metal of the internal electrode layer 12 is used for the internal electrode pattern 52. Ceramic particles are added to the metal paste as a co-material. Although the main component of the ceramic particles is not particularly limited, it is preferably the same as the main component ceramic of the dielectric layer 11. For example, barium titanate having an average particle size of 50 nm or less may be uniformly dispersed.

A plurality of the internal electrode patterns 52 may be printed on the dielectric green sheet 51 in an array. In this case, a plurality of the internal electrode patterns 52 may be arranged at least in the X-axis direction.

A first dielectric pattern 53 is printed on the dielectric green sheet 51 so as to surround the internal electrode pattern 52. Next, a second dielectric pattern 54 is printed outside the first dielectric pattern 53 in the Y-axis direction. As a result, the first dielectric pattern 53 is printed outside the internal electrode pattern 52, and the second dielectric pattern 54 is printed outside the first dielectric pattern 53 in the Y-axis direction. When a plurality of the internal electrode patterns 52 are arranged in the X-axis direction, it is preferable to print the second dielectric pattern 54 across the plurality of internal electrode patterns 52. The dielectric green sheet 51 printed with the internal electrode pattern 52, the first dielectric pattern 53, and the second dielectric pattern 54 is used as a stack unit.

(Crimping Process) Next, the dielectric green sheets 51 are peeled from the base materials. The stack units are stacked so that the internal electrode patterns 52 are alternately shifted in the X-axis direction. Next, a predetermined number (for example, 2 to 10) of a cover sheet 55 is stacked on an upper face and a lower face of a ceramic multilayer structure of the stacked stack units and is thermally crimped. The resulting ceramic multilayer structure is cut into a chip having a predetermined size. The components of the cover sheet may be the same as those of the dielectric green sheet 51. Alternatively, the additive in the cover sheet may be different from that in the dielectric green sheet 51.

(Firing Process) The ceramic multilayer structure thus obtained is subjected to a binder removal treatment in an $N_2$ atmosphere. And then, an external electrode paste, which will be the base layer of the external electrodes 20a and 20b, is applied on the ceramic multilayer structure by a dipping method or the like. The resulting ceramic multilayer structure is fired for 5 minutes to 10 hours in a reductive atmosphere having an oxygen partial pressure of $10^{-12}$ to $10^{-9}$ MPa in a temperature range of 1160 degrees C. to 1280 degrees C.

(Re-Oxidation Treatment Step) In order to return oxygen to the barium titanate, which is the partially reduced main phase of the dielectric layer 11 fired in a reducing atmosphere, $N_2$ and water vapor are mixed at about 1000° C. to the extent that the internal electrode layers 12 are not oxidized. Heat treatment may be performed in gas or in the air at 500° C. to 700° C. This step is called a re-oxidation process.

(Plating Process) After that, by a plating process, the plated layer is formed on the base layer of the external electrodes 20a and 20b. For example, plated layer includes Cu, Ni, Sn and so on. Through the processes, the multilayer ceramic capacitor 100 is obtained.

According to the manufacturing method of this embodiment, the first section 161 is formed from the first dielectric pattern 53, and the second section 162 is formed from the second dielectric pattern 54. Since the boron concentration in the first dielectric pattern 53 is higher than the boron concentration in the second dielectric pattern 54, the boron concentration in the first section 161 is higher than the boron concentration in the second section 162. Since boron has a function of promoting sintering of the ceramic material, it is possible to densify the first section 161 while suppressing oversintering of the capacity section 14. As a result, entry of moisture into the capacity section 14 can be suppressed.

On the other hand, since the boron concentration in the second section 162 is lower than the boron concentration in the first section 161, the second section 162 is not as dense as the first section 161, but the degree of segregation of silicon of the second section 162 increases. Therefore, the degree of segregation of silicon in the second section 162 is greater than the degree of segregation of silicon in the first section 161. By locating the second section 162 where the degree of segregation of silicon is high outside the side margins 16, it is possible to suppress penetration of moisture from the outside of the side margin 16.

As described above, according to the manufacturing method according to the present embodiment, a multilayer ceramic capacitor with excellent reliability can be obtained.

From the viewpoint of increasing the difference in the segregation degree of silicon, it is preferable to set a lower limit on the difference between the boron concentration in the first dielectric pattern 53 and the boron concentration in the second dielectric pattern 54. For example, the difference between the boron concentration in the first dielectric pattern 53 and the boron concentration in the second dielectric pattern 54 is preferably greater than 0.2 at %, more preferably 0.3 at % or more, still more preferably 0.4 at % or more.

On the other hand, from the viewpoint of suppressing cracks that occur when the difference in degree of densification increases, it is preferable that an upper limit is set for the difference between the boron concentration in the first dielectric pattern 53 and the boron concentration in the second dielectric pattern 54. For example, the difference between the boron concentration in the first dielectric pattern 53 and the boron concentration in the second dielectric pattern 54 is preferably 1.0 at % or less, more preferably 0.8 at % or less, still more preferably 0.6 at % or less.

From the viewpoint of suppressing oversintering, it is preferable to set a lower limit on the boron concentration in the first dielectric pattern 53. For example, the boron concentration in the first dielectric pattern 53 is preferably 0.2 at % or more, more preferably 0.3 at % or more, and still more preferably 0.4 at % or more.

From the viewpoint of suppressing oversintering, it is preferable to set an upper limit for the boron concentration in the first dielectric pattern 53. For example, the boron concentration in the first dielectric pattern 53 is preferably 2.0 at % or less, more preferably 1.5 at % or less, and still more preferably 1.2 at % or less.

From the viewpoint of suppressing oversintering, it is preferable to set a lower limit on the boron concentration in the second dielectric pattern 54. For example, the boron concentration in the second dielectric pattern 54 is preferably 0.1 at % or more, more preferably 0.15 at % or more, and still more preferably 0.2 at % or more.

From the viewpoint of suppressing oversintering, it is preferable to set an upper limit for the boron concentration in the second dielectric pattern 54. For example, the boron concentration in the second dielectric pattern 54 is preferably 1.5 at % or less, more preferably 1.2 at % or less, and still more preferably 0.8 at % or less.

From the viewpoint of suppressing oversintering, it is preferable to set a lower limit to the silicon concentrations in the first dielectric pattern 53 and the second dielectric pattern 54. For example, the silicon concentrations in the first dielectric pattern 53 and the second dielectric pattern 54 are preferably 0.1 at % or more, more preferably 0.15 at % or more, and still more preferably 0.2 at % or more.

From the viewpoint of suppressing oversintering, it is preferable to set an upper limit to the silicon concentrations in the first dielectric pattern 53 and the second dielectric pattern 54. For example, the silicon concentrations in the first dielectric pattern 53 and the second dielectric pattern 54 are preferably 2.0 at % or less, more preferably 1.5 at % or less, and still more preferably 1.2 at % or less.

Figure 9A:
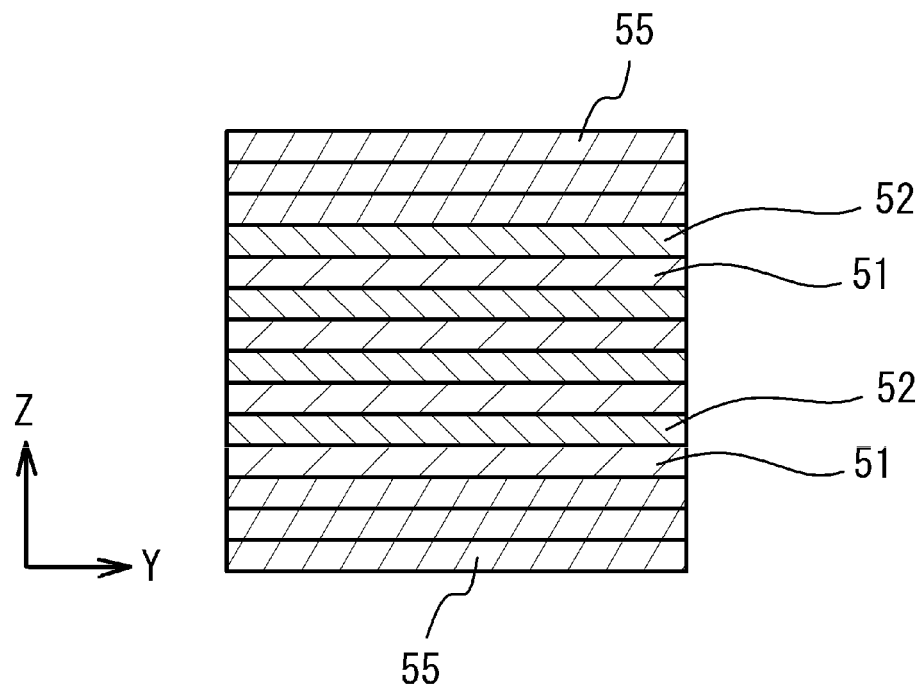
FIG. 9A and FIG. 9B illustrate another stacking process.
Figure 9B:
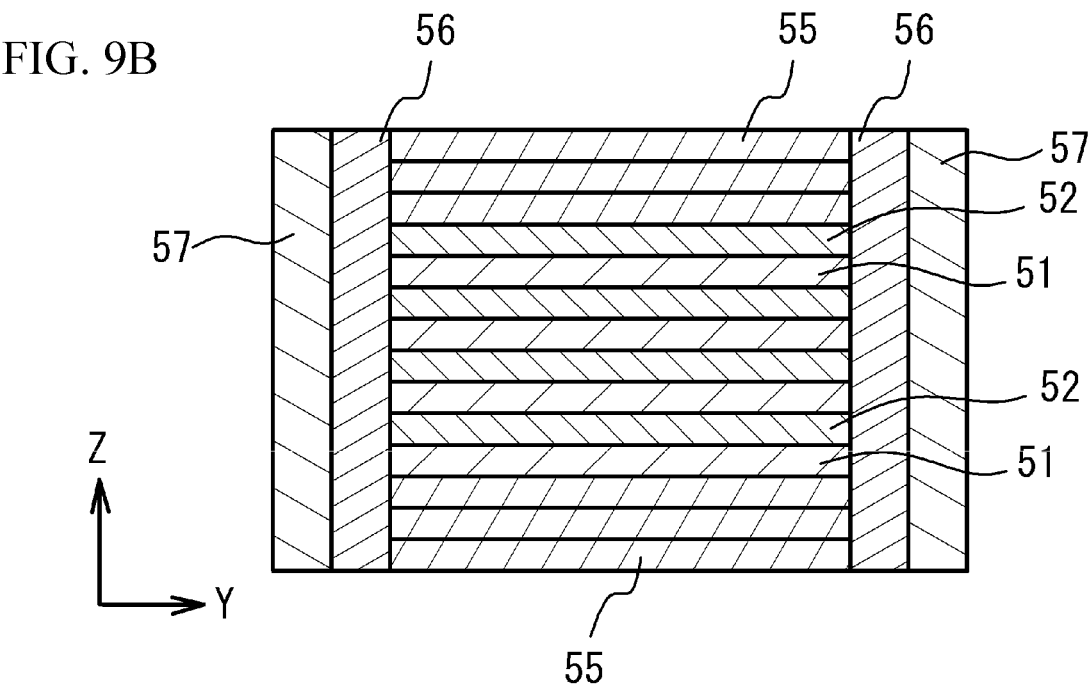

It is not necessary to form the first dielectric pattern 53 and the second dielectric pattern 54 as reverse patterns on the dielectric green sheet 51. For example, as illustrated in FIG. 9A, the dielectric green sheets 51 and the internal electrode patterns 52 having the same width as the dielectric green sheets 51 are alternately stacked to obtain a multilayer portion. The cover sheet 55 is stacked on the upper and lower surfaces of this multilayer portion. Next, as exemplified in FIG. 9B, a first dielectric sheet 56 and a second dielectric sheet 57 are attached in order to both side faces of the multilayer portion in the Y-axis direction. The first dielectric sheet 56 has the same components as the first dielectric pattern 53. The second dielectric sheet 57 has the same components as the second dielectric pattern 54.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

Examples 1 to 6 and Comparative Examples 1 to 2

A binder, an organic solvent, and a plasticizer were added to barium titanate powder and wet-mixed, and the obtained slurry was used to form the dielectric green sheet on the base material and dried. The internal electrode pattern was formed on the dielectric green sheet. Then, as illustrated in FIG. 8A and FIG. 8B, the first dielectric pattern and the second dielectric pattern were printed to form the stack unit. A ceramic multilayer structure was obtained by stacking cover sheets on the upper and lower sides of the ceramic multilayer structure obtained by stacking the stack units, thermally compressing the ceramic multilayer structure, and cutting the ceramic multilayer structure into a predetermined chip size.

In Examples 1 and 2, the boron concentration in the first dielectric pattern was set to 1.0 at %, and the boron concentration in the second dielectric pattern was set to 0.6 at %. In Examples 3 and 4, the boron concentration in the first dielectric pattern was set to 1.0 at %, and the boron concentration in the second dielectric pattern was set to 0.4 at %. In Examples 5 and 6, the boron concentration in the first dielectric pattern was set to 1.0 at %, and the boron concentration in the second dielectric pattern was set to 0.2 at %. In Comparative Examples 1 and 2, the boron concentration in the first dielectric pattern was set to 1.0 at %, and the first dielectric pattern was also printed instead of the second dielectric pattern. That is, in Comparative Examples 1 and 2, the second dielectric pattern was not provided.

After that, the obtained ceramic multilayer structure was subjected to a binder removal treatment in an $N_2$ atmosphere, and then fired in a reducing atmosphere. In Examples 1, 3, 5 and Comparative Example 1, the firing temperature (maximum firing temperature) was 1180° C. In Examples 2, 4, 6 and Comparative Example 2, the firing temperature was 1230° C.

The boron concentration in the side margin was measured using LA-ICP-MS. In any of Examples 1 to 6, it was confirmed that the boron concentration gradually decreased from the inside to the outside of the side margin in the Y-axis direction. On the other hand, in Comparative Examples 1 and 2, a decrease in boron concentration was not clearly confirmed.

The presence or absence of silicon segregation in the side margin was investigated using EPMA. Regarding the degree of segregation of silicon inclusions, if there were a plurality of areas where the strength of silicon was three times or more that of the surrounding area and was 1 square μm or more, it was judged that there was segregation of silicon. In Examples 1 to 6, in the Y-axis direction, silicon segregation was judged to be "absent" inside half of the side margin, and silicon segregation was judged to be "present" outside half of the side margin. On the other hand, in Comparative Examples 1 and 2, the segregation of silicon was judged to be "absent" at any portion of the side margin.

(Humidity Resistance) Next, each sample of Examples 1 to 6 and Comparative Examples 1 and 2 was tested for humidity resistance. As for humidity resistance, each sample was left for 24 hours after being operated for 500 hours at a temperature of 40±2° C. and a humidity of 90% to 95%. After that, the insulation resistance value was measured, and if a result of 500 μΩ·μF or more was obtained, it was judged as good "○", and if it was less than 500 μΩ·μF, it was judged as a failure "x".

(Reliability) Next, the reliability of each sample of Examples 1-6 and Comparative Examples 1-2 was tested. For reliability, an accelerated life test was performed by applying a voltage of 12 V at 125° C. As a result, if the MTTF (mean time to failure) was 500 minutes or more, the reliability was judged as good "○". If the MTTF was less than 500 minutes, it was judged to be bad "x".

The results are shown in Table 1. As shown in Table 1, in Examples 1 to 6, the moisture resistance was judged to be good "○". It is thought that this was because the concentration of boron was high in the region near the capacity section of the side margin, so densification progressed in this section, and the degree of segregation of silicon increased near the surface of the side margin, which suppressed the intrusion of moisture. Moreover, in Examples 1 to 6, the reliability was also judged to be good "○". It is thought that this was because there was an appropriate boron concentration difference between the first dielectric pattern and the second dielectric pattern, silicon segregation occurred in the second section 162 and moisture resistance could be ensured even with a relatively low sintering density, the boron concentrations in the first dielectric pattern and the second dielectric pattern could be reduced, and the amount of boron diffused into the capacity section 14 could be suppressed, and oversintering of the capacity section 14 was suppressed.

TABLE 1

| | B CONCENTRATION (at %) | | | | | | |
|---|---|---|---|---|---|---|---|
| | FIRST DIELECTRIC PATTERN | SECOND DIELECTRIC PATTERN | Si SEGREGATION | FIRING TEMPERATURE | HUMIDITY RESISTANCE | MTTF (min.) | RELIABILITY |
| EXAMPLE 1 | 1.0 | 0.6 | EXIST | 1180 | ○ | 1221 (○) | ○ |
| EXAMPLE 2 | 1.0 | 0.6 | EXIST | 1230 | ○ | 731 (○) | ○ |
| EXAMPLE 3 | 1.0 | 0.4 | EXIST | 1180 | ○ | 1082 (○) | ○ |
| EXAMPLE 4 | 1.0 | 0.4 | EXIST | 1230 | ○ | 628 (○) | ○ |
| EXAMPLE 5 | 1.0 | 0.2 | EXIST | 1180 | ○ | 1329 (○) | ○ |
| EXAMPLE 6 | 1.0 | 0.2 | EXIST | 1230 | ○ | 599 (○) | ○ |
| COMPARATIVE EXAMPLE 1 | 1.0 | — | NONE | 1180 | x | 434 (x) | x |
| COMPARATIVE EXAMPLE 2 | 1.0 | — | NONE | 1230 | ○ | 265 (x) | x |

On the other hand, in Comparative Example 1, the moisture resistance was judged to be bad "x". It is thought that this was because no segregation of silicon occurred, and therefore the intrusion of moisture could not be sufficiently suppressed. In Comparative Example 2, the humidity resistance was judged to be good "o". It is thought that this was because the sintering temperature was raised to 1230° C., and the densification of the side margin progressed. However, in Comparative Example 2, the reliability was judged as bad "x". It is thought that this was because although the side margin was densified, the sintering in the capacity section was excessively advanced due to the high firing temperature, and the internal electrode layers became spherical and regions where the distance between the electrodes was locally increased occurred.

Although the embodiments of the present invention have been described in detail, it is to be understood that the various change, substitutions, and alterations could be made hereto without departing from the spirit and scope of the invention.

What is claimed is:

1. A multilayer ceramic electronic device comprising:
a multilayer chip having a multilayer portion in which each of a plurality of dielectric layers and each of a plurality of internal electrode layers are alternately stacked and each of the plurality of internal electrode layers is alternately exposed to a first end face and a second end face opposite to the first end face of the multilayer chip, the multilayer chip having an upper face and a lower face in a stacking direction and two side faces other than the first end face and the second end face,
wherein the multilayer chip has a capacity section, in which the plurality of internal electrode layers exposed to the first end face of the multilayer chip face the plurality of internal electrode layers exposed to the second end face of the multilayer chip, and a side margin covering end portions of the plurality of internal electrode layers and the plurality of dielectric layers on the side of the two side faces, a main component of the side margin being ceramic,
wherein the side margin includes boron and silicon, and includes a first section and a second section in order from the capacity section side toward outside,
wherein a boron concentration of the first section is larger than a boron concentration of the second section,
wherein a segregation degree of silicon in the second section is larger than a segregation degree of silicon in the first section, and
wherein the boron concentration in the first section is larger than that in the second section by 0.1 at % or more.

2. The multilayer ceramic electronic device as claimed in claim 1,
wherein the second section includes pores, and wherein the silicon in the second section is segregated in the pores.

3. The multilayer ceramic electronic device as claimed in claim 1, wherein, in the side margin, the boron concentration gradually decreases from the capacity section side toward outside.

4. The multilayer ceramic electronic device as claimed in claim 1,
wherein, in the first section, the silicon is not segregated.

5. The multilayer ceramic electronic device as claimed in claim 1,
wherein the segregation degree of silicon is defined as a region where a strength of silicon measured by Electron Probe Micro Analyzer is at least twice that of a surrounding area and has a size of 1 square µm or more.

6. The multilayer ceramic electronic device as claimed in claim 1,
wherein a thickness of the first section to a thickness of the second section in a stacking direction of the first section and the section is 1:1, 2:3, or 1:2.

7. The multilayer ceramic electronic device as claimed in claim 1,
wherein a difference between the boron concentration in the first section and the boron concentration in the second section is 0.15 at % or more.

8. The multilayer ceramic electronic device as claimed in claim 1,
wherein a difference between the boron concentration in the first section and the boron concentration in the second section is 1.0 at % or less.

9. The multilayer ceramic electronic device as claimed in claim 1,
wherein the boron concentration in the first section is 0.1 at % or higher.

10. The multilayer ceramic electronic device as claimed in claim 1,
wherein the boron concentration in the first section is 1.5 at % or less.

11. The multilayer ceramic electronic device as claimed in claim 1,
wherein the boron concentration in the second section is 0.05 at % or higher.

12. The multilayer ceramic electronic device as claimed in claim 1,
wherein the boron concentration in the second section is 1.0 at % or less.

13. The multilayer ceramic electronic device as claimed in claim 1,
wherein a silicon concentration in the first section and the second section is 0.1 at % or more.

14. The multilayer ceramic electronic device as claimed in claim 1,
wherein a silicon concentration in the first section and the second section is 1.2 at % or less.

* * * * *